(No Model.)
W. SCHMID.
PHOTOGRAPHIC CAMERA.
No. 270,133. Patented Jan. 2, 1883.
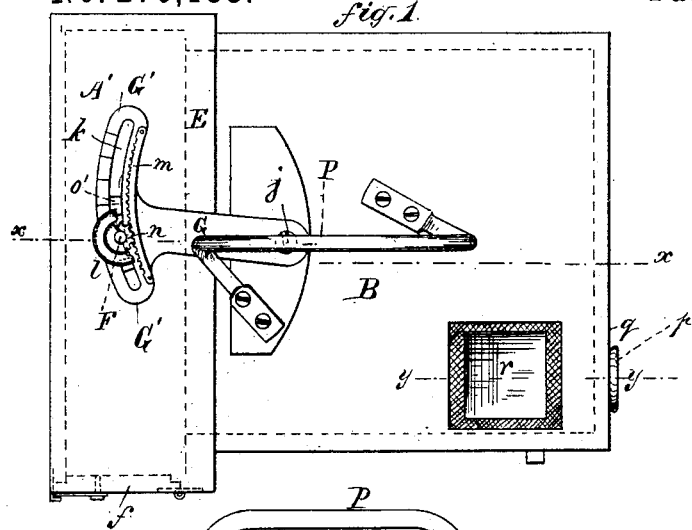
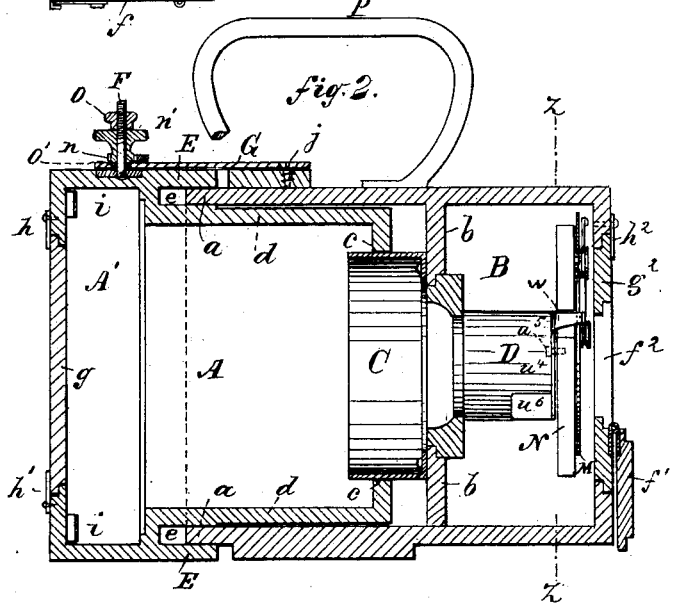
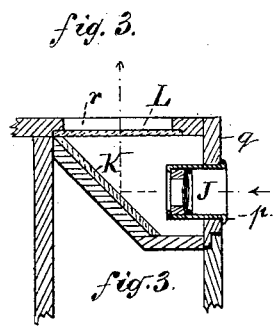
Witnesses:
Inventor
William Schmid
by J. T. Fitch
his Atty.

UNITED STATES PATENT OFFICE.

WILLIAM SCHMID, OF BROOKLYN, ASSIGNOR TO E. & H. T. ANTHONY & CO., OF NEW YORK, N. Y.

PHOTOGRAPHIC CAMERA.

SPECIFICATION forming part of Letters Patent No. 270,133, dated January 2, 1883.

Application filed August 22, 1882. (No model.)

*To all whom it may concern:*

Be it known that I, WILLIAM SCHMID, a citizen of the United States, residing at Brooklyn, in the county of Kings and State of New York, have invented a new and useful Improvement in Photographic Cameras, of which the following is a specification, reference being had to the accompanying drawings, forming part of the same, in which—

Figure 1 is a plan or top view of a camera containing my invention. Fig. 2 is a vertical section of same on line $x\,x$, Fig. 1. Fig. 3 is a section on line $y\,y$, Fig. 1, of a detached portion.

The object of my invention is to enable the photographer readily and conveniently to center the image of the object to be photographed upon the photographic plate and focus his instrument without viewing the image on the ground glass or otherwise at the place to be occupied by the plate in photographing the said image, so that he may, if he pleases, take a photograph while holding the camera in his hands or under his arm; and it consists in the devices and combination of devices hereinafter described and claimed.

I employ what is known as the "box-camera"—namely, a camera the case of which is in two parts, one telescoped into the other.

A and B are the two parts of my case. The part B slides into the part A, as shown plainly in Fig. 2. It preferably fits quite loosely therein, except near the end of B, where it should fit snugly, as shown at $a$. By this means, while a close joint is formed at $a$, too great friction is avoided.

C is a short metal tube, preferably cylindrical in form, secured to the partition $b$ in part B, concentric with the lens-tube D, that is also secured to said partition. This tube C fits into a central opening in the inner end of the part A, forming therewith a close joint at $c$, but permitting said end to slide in the said tube. By this arrangement of parts two bearings—one at $a$ and the other at $c$—are provided, which, while giving freedom, secures at the same time steadiness of movement in the sliding of the part B upon the part A.

E is a rim constituting a portion of the part A, overlapping the inner end of A, and forming with the walls $a$ of said part A a recess, $e$, into which the inner end of the part B enters, thus making a stronger and more secure joint between the two parts A and B.

A' is the apartment of the case in which the slide holding the photographic plate is placed. It is provided with a door, $f$, Fig. 1, for the introduction and removal of the slide and plate. A portion, $g$, of the end wall of this apartment may be made detachable, as shown in Fig. 2, and held in place by buttons $h\,h'$. Curved leaf-springs, (shown in section at $i\,i'$, Fig. 2,) arranged in the said apartment, press the slide firmly against one side of the said apartment.

In Figs. 1 and 2 is shown mechanism by which the part B may be moved and adjusted in the part A. It consists of the following devices: F is a pin or post fixed in the part A, about centrally, on the upper face of the case, over the apartment A'. G is an arm pivoted at $j$ to the part B. At the opposite end of this arm is a cross-bar, G', in which is a curved slot, $k$, the curve of said slot being eccentric to the pivotal point $j$. The post F passes through the said slot, all as shown plainly in Fig. 1. It is evident that when the said arm is swinging in one direction the parts A and B will be drawn together, and the swinging of said arm in the opposite direction will slide the part B out of the part A. $m$ is a curved rack on the upper face of the cross-bar G, and $n$ is a toothed pinion placed loosely on the pin F, so as to mesh with the rack $m$. This pinion is formed on the lower end of a short hollow tube, the upper end of which is enlarged to form a head, $n'$, by which the pinion may be turned by hand. O is a jam-nut, which works in a screw-thread on the upper end of the pin F. A scale may be cut or otherwise made on the face of the cross-bar G, to guide the operator in setting the parts A B to focus the instrument. In order that the bar G may slide evenly and truly on the pin F, it is preferable to make the slot $k$ a little wider than the diameter of the pin F and provide the said pin with a curved washer, O', that fits loosely into the slot.

Fig. 3 represents a supplementary apparatus by which the operator is enabled readily and conveniently to center the image of the object to be photographed at the plane where the plate is to be placed in photographing. It is preferably located in the upper outer corner of the part B, the eye-piece being seen at *p*, Fig. 1. It consists of the tube and lenses J, fixed in the end wall, *q*, of the part B, the deflector K, placed immediately behind the said tube and lenses at an angle of forty-five degrees to the axis of the lenses, and the ground-glass plate L, placed over the deflector parallel to the axis of the lenses. By this arrangement of the described parts the image of an object placed before the tube J will be thrown upon the under face of the ground-glass plate L and may be seen by the operator through the opening *r* in the case. This apparatus is so placed relatively to the photographing-lenses and the photographic plate when the latter is adjusted in the apartment A' that when the object to be photographed is seen centered on the ground-glass plate L the image from the photographing-lenses will be properly centered also on the photographic plate in the said apartment.

The case is provided at its front end with a swinging cover, *f'*, for closing the aperture *f²* in that end of the case, and a portion, *g²*, of the wall of that end may be made detachable, as shown in Fig. 2, and secured in place by a button or buttons, *h²*. It is evident that when this case is closed entirely it does not disclose by its appearance its character or purpose. It may be provided with a handle, P, for convenient handling in transportation.

It is understood that the highly-sensitive photographic plate used in what is known as the "instantaneous process" is to be employed in this camera.

What I claim as my invention, and desire to secure by Letters Patent, is—

1. A photographic-camera case composed of the two parts A and B, the former having the recess *e*, into which the end of the latter fits, and the latter being provided with the tube C, that fits into an opening in the end of the part A, whereby the two bearings *a c* are provided, substantially as and for the purpose described.

2. The combination, with the described case, composed of the two parts A and B, of the swinging arm G, pivoted to the part B, in the cross-bar G' of which is the eccentric slot *k*, the rack *m* on the said bar, the pin F, and the pinion *n* on the said pin meshing with the said rack, all as and for the purpose described.

3. The combination, with the described camera, of the supplementary tube and lens J, together with the deflector K and the plate L, arranged relatively to the photographing-lenses of the camera, as described, so that when the image of an object to be photographed is seen centered on the plate L an image of the same object will be thrown by the said photographic lenses properly centered upon the photographic plate placed in the apartment A', all as specified.

4. The described photographic-camera case, composed of the parts A and B, the part A divided as described, so as to form a chamber, A', having a door, *f*, and the part B having an opening, *f²*, and provided with the door *f'*, all constructed and arranged substantially as and for the purpose described.

WILLIAM SCHMID.

In presence of—
A. G. N. VERMILYA,
P. B. VERMILYA.